United States Patent [19]
Rand

[11] Patent Number: 5,038,358
[45] Date of Patent: Aug. 6, 1991

[54] TRIO UPCONVERSION LASER SYSTEM
[75] Inventor: Stephen C. Rand, Ann Arbor, Mich.
[73] Assignee: The University of Michigan, Ann Arbor, Mich.
[21] Appl. No.: 525,387
[22] Filed: May 17, 1990

Related U.S. Application Data

[63] Continuation-in-part of Ser. No. 487,885, Mar. 2, 1990.
[51] Int. Cl.⁵ ............................................. H01S 3/09
[52] U.S. Cl. ...................................... 372/69; 372/41; 372/34; 372/99
[58] Field of Search ...................... 372/41, 69, 34, 99, 372/91

[56] References Cited
U.S. PATENT DOCUMENTS 4,782,494 11/1988 Pollack et al. ........................ 372/69
4,807,240 2/1989 Goldstone ............................. 372/69

Primary Examiner—Léon Scott, Jr.
Attorney, Agent, or Firm—Rohm & Monsanto

[57] ABSTRACT

Continuous laser action is sustained by a new pumping mechanism which relies exclusively on cooperative electronic transitions of coupled atoms or ions in solids. The laser depends on energy-sharing interactions between a trio of atoms in gases or active dopants in solid laser media to create the population inversion needed for amplification of light. In one specific embodiment, the laser crystal is formed of calcium fluoride doped heavily with trivalent erbium, and is provided with reflective coatings on respective first and second surfaces. A pumping energy is supplied whereby a three atoms are elevated to an initial excited state. Subsequently, two of the atoms lose energy so as to assume a ground state, the energy released thereby being made available to excite the third atom to a still higher quantum energy state. Thus, a cooperative energy interaction between the trio of atoms results in the double excitation of one of the atoms above the initial excitation state. The excited ion subsequently, upon relaxation to its initial excited energy level, causes the issuance of the laser photon.

20 Claims, 8 Drawing Sheets

TRIO UPCONVERSION LASER SYSTEM

RIGHTS OF THE U.S. GOVERNMENT

This invention was made with government support under contract (Contract Number F49620-88-C-0079) awarded by the U.S. Air Force Office of Scientific Research. The government has certain rights in the invention.

RELATIONSHIP TO OTHER APPLICATION FOR LETTERS PATENT

This application for U.S. Letters Patent is a continuation-in-part of copending application Ser. No. 487,885, filed Mar. 2, 1990, by the same inventor and assigned to the same assignee, as herein.

BACKGROUND OF THE INVENTION

This invention relates generally to laser systems, and more particularly, to a laser device which relies upon energy-sharing interactions between atomic trios in gases or active dopants in laser media, and thus forms a new operating principle for continuous-wave solid state lasers.

Lasers which operate with an output wavelength shorter than that of the excitation have been known since the early 1970s. Subsequently, various continuous-wave lasers have been reported in the prior art wherein upconversion occurs by different mechanisms. Moreover, inversions of upconverted energy are reported to have been sustained by avalanche processes, direct pair pumping, and multi-photon absorption with variable contributions from energy transfer. To date, continuous-wave unconversion lasers have operated in Pr, Er, Tm, and Nd-doped solids, exhibiting surprisingly high efficiencies (up to 30%) in simple and robust monolithic designs.

The tremendous growth in laser technology and the actual and potential applications of such devices have placed greater demands on the need for lasers which operate efficiently at short wavelengths. Additionally, the demand has increased dramatically for laser systems which are compact and efficient in their energy utilization. One application which has taken significantly increased prominence in recent years is in the field of data storage technology, particularly in the compact disk medium. There is a need for a new, short wavelength solid state laser which operates in the ultraviolet range, so as to enable smaller focal spot sizes. In the compact laser disk medium, a smaller focal spot size produces a significant increase in the data storage density for a given area.

In the present state of the art, existing compact disk technology relies largely upon GaAs-GaAlAs diode lasers which operate at wavelengths on the order of 800 nm in the near infrared region. A reduction in the wavelength by a factor of two, so as to produce energy in the range of 400 nm, would result in an improvement in storage capacity by a factor of four. Such disproportionate benefit results from the fact that spot radius is proportional to wavelength, but storage density depends on the spot area, which is proportional to the square of the radius. Thus, significant improvements in storage capacity can be achieved from relatively small decreases in operating wavelength. In addition to the foregoing, it is now recognized that the commercial potential of short wavelength lasers is increased by reduction of total power consumption and miniaturization. Of the various categories of conventional lasers which exist, solid state lasers appear to lend themselves best to the achievement of these ends.

There are currently no blue or ultraviolet solid state lasers which operate continuously and which have been developed commercially for compact disk applications or other technologies, such as space communications. There is a need for a new method of laser excitation which permits the development of new short wavelength solid state lasers. There has previously been no suitable excitation mechanism for such lasers.

It is not presently possible to deliver conventional excitation at still shorter wavelengths without severely heating and damaging the solid laser medium. Thus, efforts to produce emission wavelengths short enough to approach the fundamental absorption edge of solids have yielded very low efficiencies. Pump light cannot penetrate to the interior of the laser medium Thus, there is a need for a pumping system which permits excitation at longer wavelengths than either the emission wavelength or the energy of the emitting state with respect to the ground state. In this manner, penetration of the pump light would not be a problem, and deleterious color center formation can be avoided.

It is, therefore, an object of this invention to provide a laser system wherein short-wavelength emission is achieved in response to long-wavelength excitation of laser media.

It is another object of this invention to provide a laser arrangement wherein a population inversion required for light amplification is achieved in response to energy sharing interactions between colliding atoms in gases.

It is also an object of this invention to provide a laser arrangement wherein a population inversion required for light amplification is achieved in response to energy sharing interactions between colliding atoms in active dopants in solid laser media.

It is a further object of this invention to provide a short-wavelength laser system which does not require pump sources with more energy per photon than the emitting state of the laser transition.

It is additionally an object of this invention to provide a laser arrangement which achieves a reduced focal spot size.

It is yet a further object of this invention to provide a laser arrangement which improves the storage density of a compact disk.

It is a still further object of this invention to provide an excitation mechanism for a continuous-wave short-wavelength laser system.

It is also another object of this invention to provide a laser system which can operate at wavelengths on the order of 400 nm.

It is yet an additional object of this invention to provide a laser arrangement which is adaptable for miniaturization, and which is efficient in its energy utilization.

It is still another object of this invention to provide a pair-pumped solid state laser wherein the wavelength of the emitted energy is significantly shorter than that of the pump light.

It is also a further object of this invention to eliminate deleterious color center formation in a laser arrangement.

It is additionally another object of this invention to provide a continuous-wave solid state laser in which pumping is provided by cooperative unconversion due to coupled dopant atoms or ions (pair-pumping or trio-pumping) in the solid laser media.

A still further object of this invention is to provide a laser excitation system in which pump light is absorbed on a strong transition with only one ion of a pair being effectively excited at a time.

An additional object of this invention is to provide a laser system which produces laser light having a wavelength characteristic which is on the order of one-half that of the pump light.

SUMMARY OF THE INVENTION

The foregoing and other objects are achieved with this invention which provides, in an apparatus aspect thereof, an arrangement for creating population inversion for use in a continuous wave pair-pumped laser system. In accordance with a specific embodiment of the invention, a laser crystal which is formed of calcium fluoride is doped to a predetermined extent with trivalent erbium, and is configured to have first and second surfaces coated for achieving predetermined reflectivity characteristics. A pumping system is provided for supplying a pumping energy to the laser crystal and causing respective ones of the atoms in the laser crystal to gain energy so as to assume respectively higher energy, or quantum, states. Subsequently, pairs of near neighbor ions in these higher energy states spontaneously assume a lower energy state and redistribute or share their total energy with a third atom which assumes a still higher energy states. In this manner, laser action is achieved by cooperative unconversion induced by ion-trio interactions.

In a specific embodiment of the invention, the laser crystal is doped with trivalent erbium to an extent of approximately 5%. Thus, the laser crystal is heavily doped, in this embodiment, with a rare earth multivalent dopant.

In one embodiment of the invention, the pumping means is of a type which produces a continuous pumping energy. In this manner, the atoms in the laser crystal are urged continuously to the respective higher and lower energy states. The atoms in the laser crystal are erbium ions.

In a practical embodiment of the invention, the laser crystal is cut to a thickness of about 3 mm, and both faces are polished to a laser-grade finish. One face is flat; within a tenth of a wavelength. The second face is convex, and has a convex radius of curvature of about 2.5 cm. The convex face, or end, of the laser crystal is coated to achieve a reflectivity of less than 0.25% at 1.5 microns, and 100% at 2.8 microns. The flat surface is coated for 98% reflectivity at 2.8 microns, and also serves as the partially reflecting output coupler.

In the specific embodiment, the laser crystal is pumped by a continuous-wave NaCl color center operating at approximately 1.5 $\mu$m. The beam is focused into the crystal at room temperature with a single lens of focal length of about 5 cm. This excitation is sufficient to produce continuous laser action at an output wavelength of approximately 0.85 $\mu$m with only very small amplitude fluctuations. Because the cooperative unconversion mechanism is nonlinear, and nonlinear systems typically exhibit sustained oscillations or even chaotic behavior, this result is not an obvious extension of previous pulsed pair-pumped laser work.

In still further embodiments of the invention, the crystal host may be changed to alter the proportion of dopant ions which cluster as pairs. For example, crystals which are isomorphic with $CsNiCl_3$, such as $CsCdBr_3$, are known to incorporate trivalent rare earth ions predominantly as near neighbor pairs, all oriented identically along the optic axis. This kind o crystal incorporates dopant ions far more efficiently as pairs than ordinary crystals, and it will tend to avoid unnecessary absorption losses due to unwanted aggregates of three or more ions, or of single ions. It is to be understood that other rare earth ions, or transition ions, may be used in the practice of the invention. Additionally, a variety of cavity configurations are available in the practice of the invention, the configuration of which is within the knowledge of persons of skill in the art. For example, the mirrors need not be deposited directly on the crystal, and may be stably configured external thereto.

In addition to the foregoing, the laser system of the present invention is not limited to the employment of solid laser media. Appropriate vapors or gas mixtures may be substituted for the solid pair-pumped laser medium. Collisions between excited atoms in gases will cause transient coupling equivalent to the coupling between dopants in solids. Collision-induced transitions can result in a variety of normally forbidden processes, including spontaneous, cooperative unconversion processes, and pair-pumped laser action, just as in condensed media.

In accordance with a method aspect of the invention, a method of creating continuous-wave laser emission is provided with the steps of:
providing a multiple quantum level environment for atoms wherein said atoms can achieve selectably higher and lower quantum levels than their initial excited state;
cooling said multiple quantum level environment;
controlling emission of an output light to a wavelength of approximately 0.855 microns;
providing a pumping source for generating a pumping energy; and
directing said pumping energy toward said multiple quantum level environment so as to cause respective ones of said atoms within said multiple quantum level environment to gain energy and assume a respectively higher energy state than said initial excited state and respective others of said atoms to lose energy and assume a lower energy state than said initial excited state, whereby the continuous-wave laser action is achieved by cooperative energy unconversion induced by atom-atom interactions.

In a specific embodiment of this method aspect of the invention, there is additionally included the step of providing a multiple quantum level environment which comprises the further step of doping the multiple quantum level environment with a dopant which is characterized by containing multivalent rare earth ions. In a highly advantageous embodiment, the dopant is erbium, and the multiple quantum level environment is formed of calcium fluoride. In the alternative, the multiple quantum level environment may be formed of $CsCdBr_3$, which is isomorphic with $CsNiCl_3$, and the dopant might be some other rare earth such as praseodymium or neodymium. The dopant is not limited to being a rare earth ion, but may be a transition metal ion. Of course, more conventional laser host crystals, such as $LiYF_4$ may be employed in the practice of the invention.

In accordance with a further method aspect of the invention, there is provided a method of creating continuous-wave laser emission having a predetermined wavelength characteristic, the method being characterized by:

providing a multiple quantum level environment for atoms associated with a multivalent dopant, the multiple quantum level environment being characterized by having at least three energy levels wherein said atoms can achieve selectably higher and lower quantum levels than their initial excited states;

providing a pumping source for generating a pumping energy having a wavelength characteristic which is longer than that of the laser emission; and directing said pumping energy toward said multiple quantum level environment so as to cause respective ones of said atoms within said multiple quantum level environment to gain energy and assume a respectively higher energy state, as two of said atoms lose energy and assume a lower energy state, whereby the continuous-wave laser action is achieved by cooperative energy unconversion induced by triple atom interactions.

In the present embodiment which relies on erbium ions, the respectively higher energy state $^4S_{3/2}$ is several quantum levels above the initial excited state $^4I_{13/2}$, and the laser action has a wavelength determined by transitions between these two states.

BRIEF DESCRIPTION OF THE DRAWING

Comprehension of the invention is facilitated by reading the following detailed description, in conjunction with the annexed drawing, in which.

DETAILED DESCRIPTION

Figure 1:
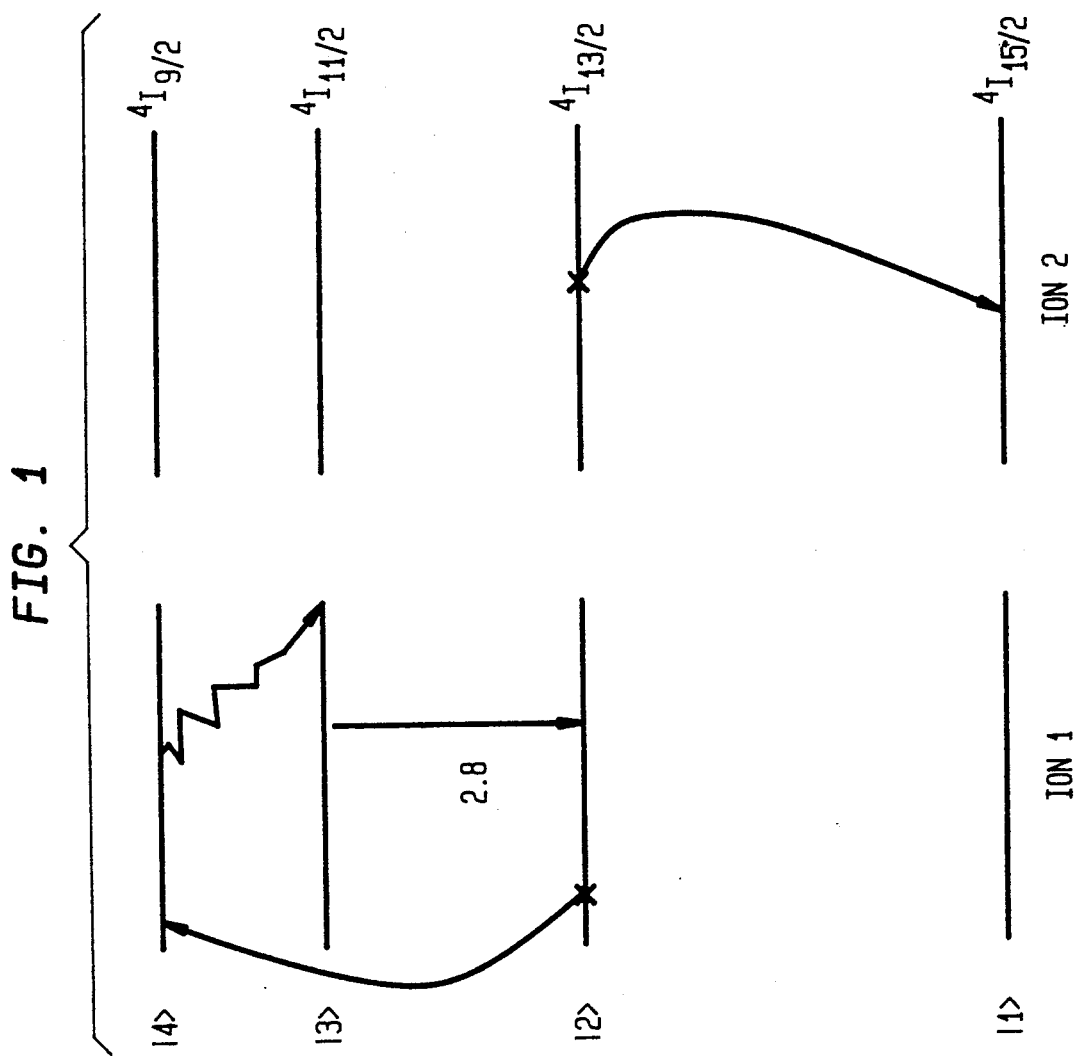
FIG. 1 is a schematic representation of the energy levels involved in the continuous wave pair-pumped erbium laser, illustrating the cooperative pair process involving two resonantly excited ions, which results in population inversion in the unconverted energy state $^4I_{11/2}$.

FIG. 1 is a schematic representation of the energy levels which are involved in the continuous-wave, pair-pumped erbium laser system. As shown in this figure, the curved arrows indicate the cooperative pair-process involving two resonantly excited ions which result in population inversion in the unconverted energy state $^4I_{11/2}$. FIG. 1 is divided into two representations, one associated with Ion 1 and the other associated with Ion 2. Both such ions are initially located in excited state $^4I_{13/2}$, by virtue of absorption of pump light. By virtue of electromagnetic coupling between Ion 1 and Ion 2, Ion 1 is spontaneously energized to energy level $^4I_{9/2}$. Ion 2, on the other hand, loses energy and assumes energy level $^4I_{15/2}$. Thus, one ion becomes "doubly excited" while the other becomes de-excited.

Doubly excited Ion 1 subsequently is subjected to an energy decay from quantum level $^4I_{9/2}$ to $^4I_{11/2}$. A photon corresponding to an energy of 2.8 microns is issued upon the relaxation of Ion 1 to level $^4I_{13/2}$.

As a result of the high dopant concentration and the nature of the crystal host used, aggregates of rare earth ions exist within the solid. These aggregates consist of dopant ions in clusters. Electromagnetic coupling between dopant neighbors in pair clusters permits two ions which individually reach an excited state by absorbing single photons from the incident light to "pool" or combine their energy through what is known as a "cooperative" transition. This mechanism, which is represented in FIG. 1, results in the double excitation and the de-excitation of the respective members of the ion pair.

Figure 2:
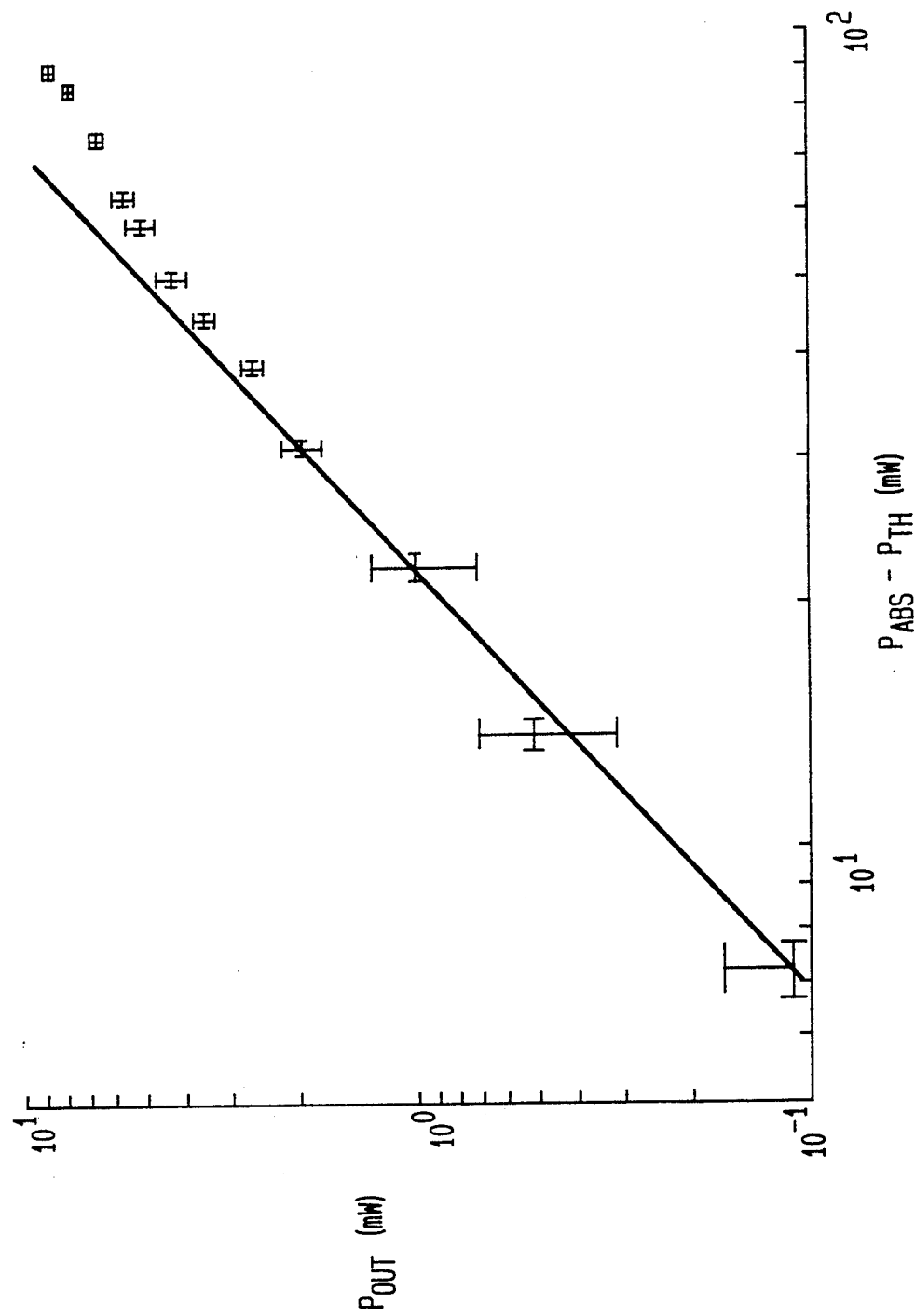
FIG. 2 is a graphical representation in log-log format which is useful in illustrating the differences between the continuous wave output power of the $Er^{3+}:CaF_2$ pair-pumped unconversion laser versus absorbed continuous wave input power above threshold.

FIG. 2 is a graphical representation in log-log format which illustrates the differences between the continuous wave output power of the $Er^{3+}:CaF_2$ upconversion laser versus absorbed continuous wave input power above threshold. As shown in this figure, the solid curve illustrates the quadratic dependence followed at low powers and shows the onset of saturation at higher powers.

Figure 3:
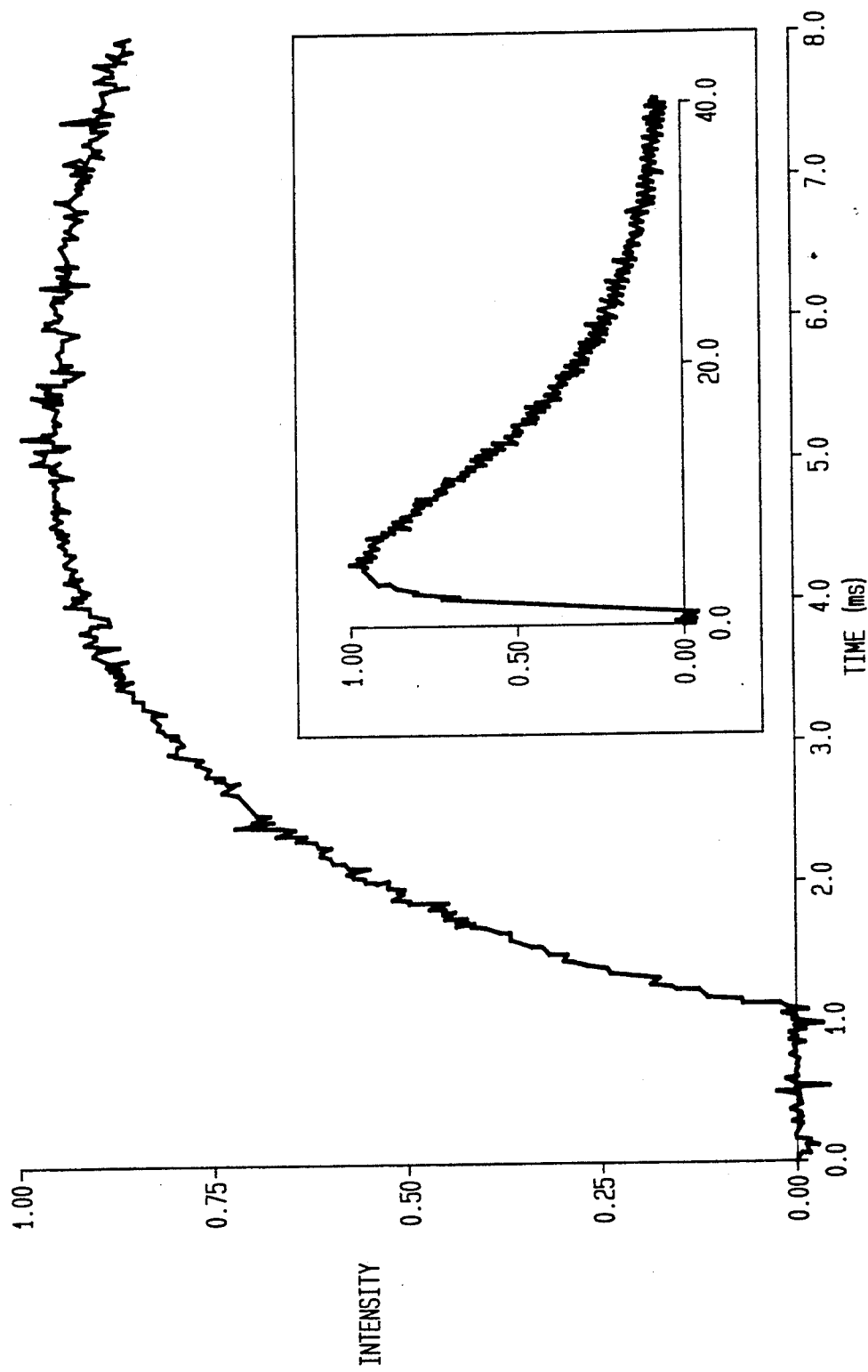
FIG. 3 is a graphical representation of $^4I_{11/2}$ to $^4I_{15/2}$ fluorescence versus time at 985 nm excited by a 30 microsecond, rectangular laser pulse having a wavelength of 1.51 microns, and is useful in illustrating pumping by a pair process wherein one ion loses energy and the other gains energy, as well as the absence of other pumping mechanisms such as two-photon absorption which would cause an immediate jump in the florescence intensity within the 30 microsecond pump pulse duration.

FIG. 3 is a graphic representation of fluorescence resulting from transitions from $^4I_{11/2}$ to $^4I_{15/2}$, plotted versus time, at 985 nm excited by a 30 microsecond, rectangular laser pulse having a wavelength of 1.51 microns. This representation illustrates that pumping by a pair process, wherein one ion loses energy and the other gains energy, is occurring in the operation of the device without contributions due to two-photon absorption greater than 1 percent. The absence of fluorescence response during the excitation pulse indicates that the upper laser level is only populated after termination of pumping by the pair process. As previously indicated, one ion loses energy by returning to the ground state. The other ion gains energy by unconversion to the energy level $^4I_{9/2}$ which then relaxes rapidly to populate the upper laser level $^4I_{11/2}$.

Figure 4:
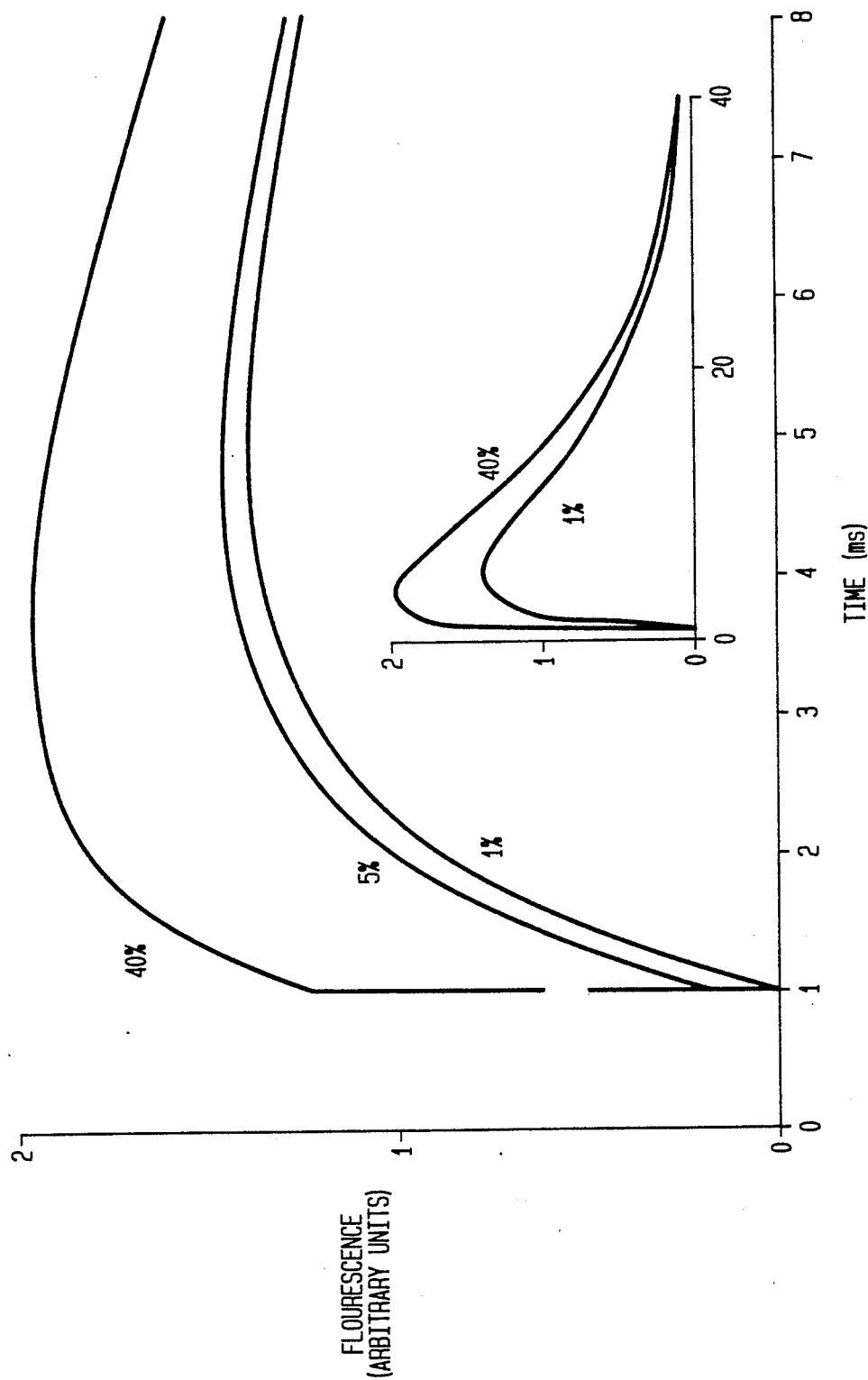
FIG. 4 is a graphical representation of the calculation of the expected evolution of fluorescence when various proportions of the of the excited state population furnished by 2-photon absorption during the 30 microsecond pulse interval of FIG. 3.

FIG. 4 is a graphical representation of the calculation of the expected evolution of fluorescence when various proportions of the of the excited state population are furnished by 2-photon absorption during the 30 microsecond pulse interval, described hereinabove with respect to FIG. 3. The experimentally derived ratio of 2-photon to 2-atom contributions is evidently much smaller than $10^{-2}$ at short times. In the steady state, it contributes even less, because the pair rate grows as the square of the excited state density.

The continuous-wave operating characteristic of the laser of the pair-pumped was verified by monitoring the narrow beam emission transmitted by a 2.8 micron interference filter having a spectral band width of 10 nm, and using a fast photodiode having an electronic band width of 1 Mhz. Even without active cooling of the crystal, stable operation of this device has been observed for many hours with no spiking or sustained oscillations greater than -15 dB.

Figure 5:
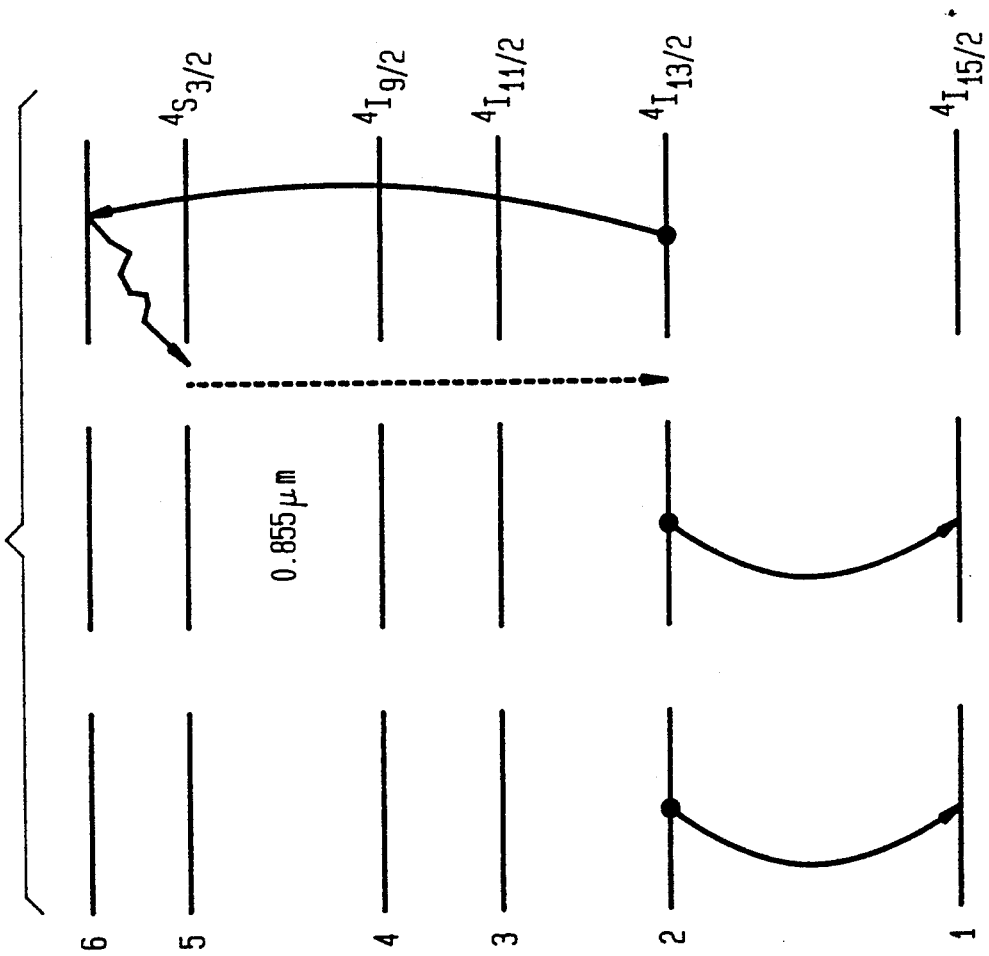
FIG. 5 is a schematic representation of the energy levels involved in the continuous wave trio-pumped erbium laser, in accordance with the principles of the present invention, illustrating the cooperative trio process involving three resonantly excited ions, which results in steady-state inversion of level $^4S_{3/2}$ with respect to level $^4I_{13/2}$ in $Er:CaF_2$.

FIG. 5 is a simplified schematic representation of the basic dynamics in a six-level model of a trio-pumped trivalent erbium laser constructed in accordance with the principles of the invention. This figure shows the energy levels involved in the continuous wave trio-pumped erbium laser and further illustrates the cooperative trio process involving three resonantly excited ions, which results in steady-state inversion of level $^4S_{3/2}$ with respect to level $^4I_{13/2}$ in Er:CaF$_2$. The initial excited state, with three Er ions in the $^4I_{13/2}$ state, is prepared by continuous-wave irradiation at 1.51 $\mu$m on the $^4I_{15/2}$-$^4I_{13/2}$ absorption resonance. The curved arrows indicate the dynamics schematically, with two atoms returning to the ground state while one is promoted to the upper laser level.

In FIG. 5, each manifold is represented by a single level, and cooperative transitions are permitted only in level 2. Level 2 is considered to be very long-lived at low excitation densities. In actuality, level 3 of $Er^{+3}$ is also long-lived, but its population arises entirely from level 2 pair processes. Thus, it contributes to effective losses in the erbium pair laser and to quartic unconversion, but not to the cubic upconversion processes which are of interest in the practice of the present invention. The present model includes the possibility of direct absorption of pump photons by ions maintained in level 4 by cooperative pair unconversion to reach the upper laser level. Diagonal density matrix elements for this non-linear system are:

$$\frac{d}{dt} \rho_{11} = \gamma_{51}\rho_{55} + \gamma_{41}\rho_{44} + \gamma_{31}\rho_{33} + \gamma_{21}\rho_{22} + \quad (1)$$

$$\alpha\rho_{22}^2 + 2\beta\rho_{22}^3 - B_{12}I(\rho_{11} - \rho_{22})$$

$$\frac{d}{dt} \rho_{22} = \gamma_{52}\rho_{55} + \gamma_{42}\rho_{44} + \gamma_{32}\rho_{33} - \gamma_{21}\rho_{22} + \quad (2)$$

$$\kappa_{25}(\rho_{55} - \rho_{22}) - 2\alpha\rho_{22}^2 - 3\beta\rho_{22}^3 - B_{12}I(\rho_{11} - \rho_{22})$$

$$\frac{d}{dt} \rho_{33} = \gamma_{53}\rho_{55} + \gamma_{43}\rho_{44} + \gamma_{33}\rho_{33} \quad (3)$$

$$\frac{d}{dt} \rho_{44} = \gamma_{54}\rho_{55} + \gamma_{4}\rho_{44} + \alpha\rho_{22}^2 - B_{46}I(\rho_{44} - \rho_{66}) \quad (4)$$

$$\frac{d}{dt} \rho_{55} = \gamma_{65}\rho_{66} - \gamma_{5}\rho_{55} - \kappa_{25}(\rho_{55} - \rho_{22}) \quad (5)$$

$$\frac{d}{dt} \rho_{66} = -\gamma_{6}\rho_{66} + \beta\rho_{22}^3 + B_{46}I(\rho_{44} - \rho_{66}) \quad (6)$$

where the spontaneous relaxation rate between level i and j is given by $\gamma_{ij}$ and $B_{ij}$ is the induced rate between i and j. The and trio unconversion coefficients are $\alpha$ and $\beta$, respectively. $\kappa_{ij}$ is the rate of stimulated emission from i to j and $\gamma_i$ is the decay rate of level i.

In Eq. (2), there is quadratic loss term corresponding to a pair process and a cubic term for rio unconversion. In the former process, two ions are lost for each transition, requiring the indicated factor of two. One ion returns to ground while the other is upconverted to level 4. In the trio process, three atoms leave level 3 requiring a factor of three in the cubic loss coefficient. Two of the excited ions return to ground and one is upconverted directly to level 6 with subsequent rapid decay to level 5. Of central importance here is the result that in the absence of cavity losses or pair unconversion a steady-state inversion between levels 2 and 5 can be maintained if:

$$\beta \cong \frac{\gamma_5(\gamma_5 + 3\gamma_6)^2}{\gamma_6^2} \left[ 1 + \frac{(\gamma_2 + \gamma_{51} + 2\gamma_5)\gamma_6}{(\gamma_5 + 3\gamma_6)B_{12}I} \right]^2 \quad (7)$$

Conditions for steady-state inversion in coupled-atom systems do not guarantee stable continuous-wave operation. The oscillator system is highly non-linear and may exhibit unstable or even chaotic states. Hence, a stability analysis is required to ensure theoretically stable operation of the laser. Trio laser stability has been analyzed by the inventor herein with a simplified four level model (omitting levels 4 and 5) by introducing small perturbations and linearizing system response near steady-state conditions. The Routh-Hurwitz criterion was found to predict stable oscillation when the highest state, the trio-pumped state, was short-lived compared to other levels in the system. To demonstrate an erbium trio laser experimentally, a 3 mm thick crystal of 5% Er:CaF$_2$ was prepared with one flat surface and one convex surface of radius 2.5 cm. Both surfaces were anti-reflection coated in the range 1.4–1.6 $\mu$m. Additionally, in the range 0.8–0.9 $\mu$m, the curved surface was coated for total reflection (R > 99.9%) and the flat surface served as a 0.5% output coupler. The sample was pumped longitudinally at liquid nitrogen temperature with a continuous-wave NaCl color center laser focussed by a 5.0 cm lens, and it absorbed 74% of incident light at 1.51 $\mu$m. For incident intensities above a threshold of 10 energy, TEM$_{00}$ laser emission was observed at 0.855 $\mu$m as shown in FIG. 6.

Figure 6:
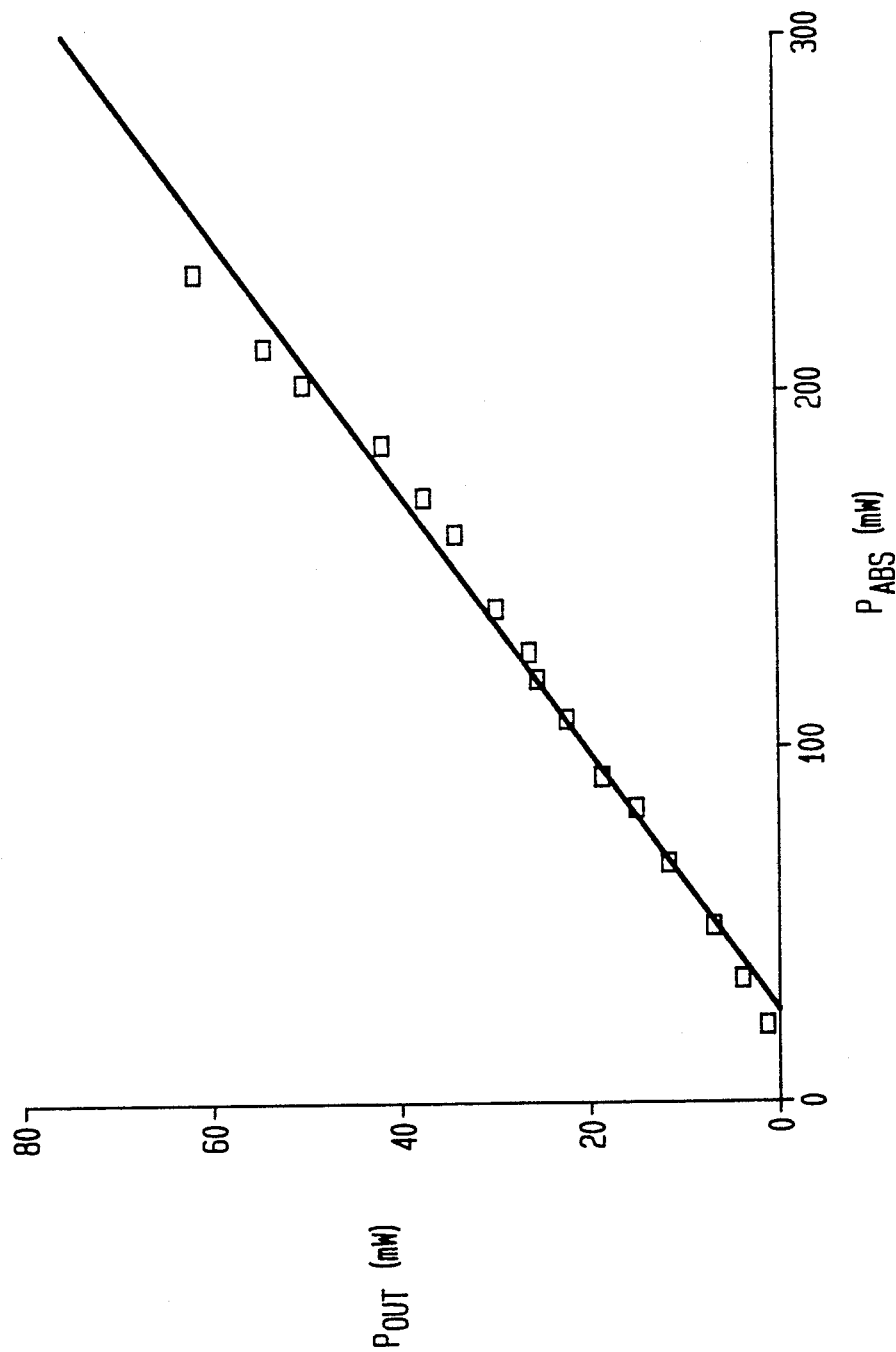
FIG. 6 is a graphical representation of a continuous-wave trio-pumped Erbium laser output versus absorbed incident power.

FIG. 6 is a graphical representation of a continuous-wave trio-pumped Erbium laser output versus absorbed incident power. The solid curve has a slope of approximately one when graphed versus absorbed input power. This linear response does not show evidence of saturation.

A maximum of 64 mW continuous-wave output was obtained for 235 mW of absorbed pump power, for an overall efficiency of 26% and a slope efficiency of 28%. No spiking behavior was observed and amplitude fluctuations were 15 dB below the output level within the measurement bandwidth (DC - 1 MHz).

Figure 7:
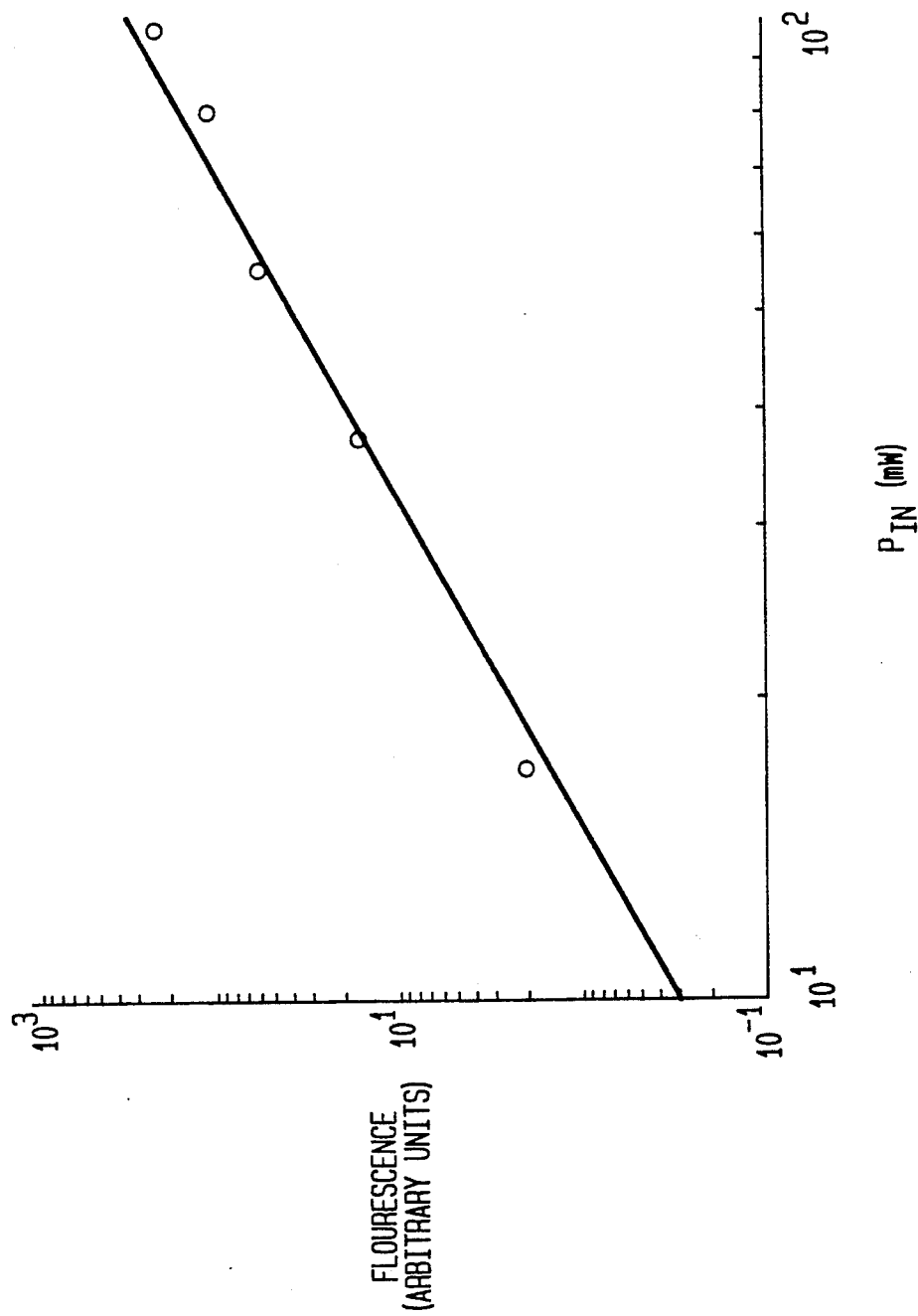
FIG. 7 is a graphic representation (log-log) which illustrates fluorescence of 0.855 μm versus excitation intensity, as well as cubic dependence for the unconversion emission.

FIG. 7 is a graphical representation (log-log) which illustrates fluorescence at 0.855 $\mu$m versus excitation intensity. The solid curve illustrates a cubic dependence for the unconversion emission. The intensity dependence of upconversion fluorescence shown in FIG. 7 reveals that level 5 is populated by a process varying with the cube of the incident intensity. This is a significant aspect of the present invention since there are only two possible channels for populating upper laser level 5 by a cubic process. One channel is a trio process and the other is absorption of a pump photon by pair-pumped ions in level 4. A conceptual third possibility consisting of ground state 3-photon absorption may be ruled out by the absence of 2-photon processes in experimental measurements (see, FIG. 3). The two remaining possibilities are distinguishable from one another using time-resolved fluorescence measurements as illustrated in FIG. 8.

Figure 8:
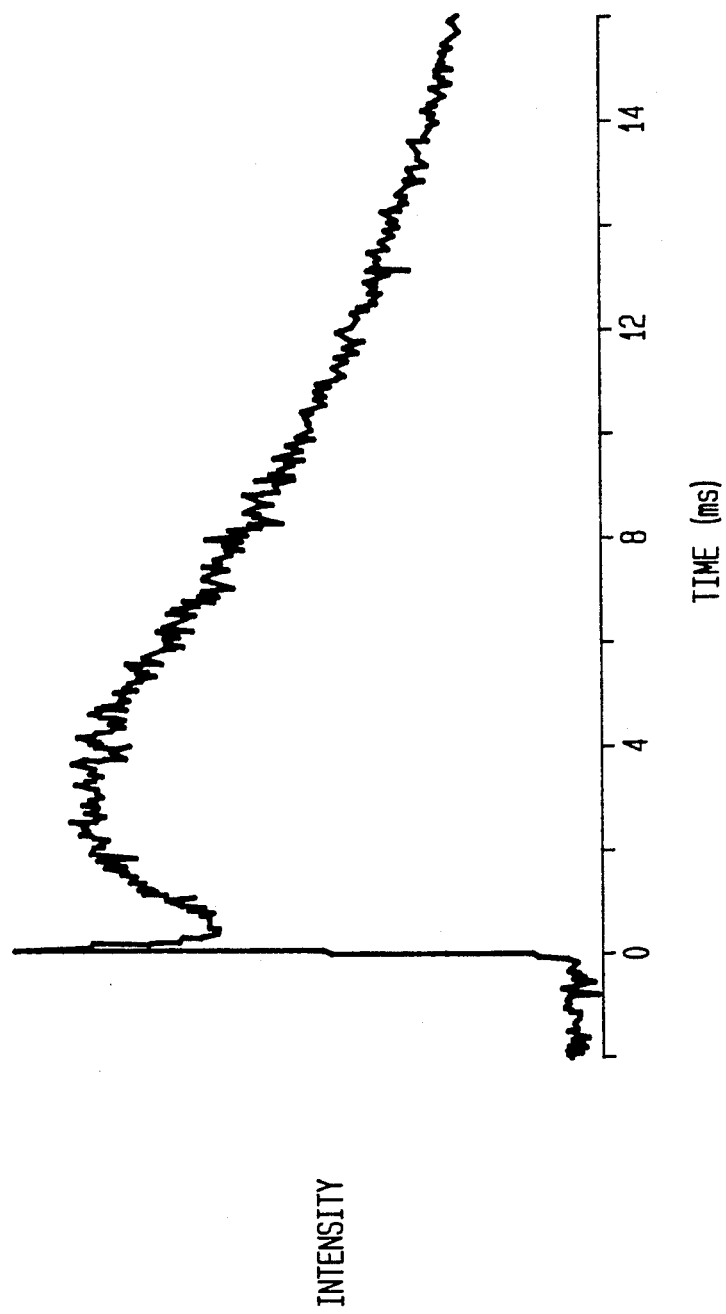
FIG. 8 is a graphical representation which illustrates the time dependence of fluorescence at 0.855 μm from the upper laser level following pulsed excitation below threshold.

FIG. 8 is a graphical representation which illustrates the time dependence of fluorescence at 0.855 μm from the upper laser level, monitored with a fast photomultiplier (not shown) following pulsed excitation below threshold. A substantially rectangular pulse of 100 μs duration and 8.0 mW peak power was selected acousto-optically from the continuous-wave pump beam for this purpose. Signal averaging of 4000 scans was used to obtain acceptable signal-to-noise ratio.

Two components are evident in the experimental curve. The first is a prompt component with a rise time equal to the pulse duration, followed by a subsequent rapid decay. This component can only be due to pump absorption by pair-upconverted ions in state $^4I_{9/2}$, since the signal decays when the pulse ends and yet 2-photon absorption contributions to $^4I_{9/2}$ populations are insignificant under these conditions. This component therefore corresponds to the pair-mediated channel. The second component rises slowly, reaching its maximum long after the excitation pulse is over. The only remaining process furnishing cubic upconversion to $^4S_{3/2}$ is one involving three excited $^4I_{13/2}$ ions. Hence, the second component corresponds to the trio contribution and on the basis of relative area under its portion of the curve, is overwhelmingly dominant in the pumping process.

The overall efficiency of the trio-pumped laser is 26% at 235 mW pump power. Its slope efficiency is nearly 30%, using a linear approximation for the output curve versus input, and as previously noted, its threshold is only 10 mW. The trio laser therefore is seen to have much higher efficiency and lower threshold than the pair-pumped erbium laser. This is a rather unexpected result, due partly to the absence of water absorption at the emission wavelength, as well as the higher cavity Q. Also, amplitude fluctuations are much smaller in the trio laser output. This result may be related to the very short lifetime of level 6 which discourages back transfer.

The erbium trio laser achieves continuous-wave operation on a self-quenched transition with lower laser level pumping. This non-linear pumping scheme, in addition to providing new unconversion lasers, also may provide continuous-wave rare earth lasers in other highly doped crystals on previously unusable self-terminating transitions.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for creating a population inversion for use in a laser device, the arrangement comprising:

a laser crystal formed at least partially of $CaF_2$, said laser crystal being doped with trivalent erbium and having at least a first surface provided with a mirror coating having a 0.855 micron wavelength transmission characteristic; and pumping means for supplying a pumping energy to said laser crystal and causing respective ones of said atoms within said laser crystal to gain energy so as to achieve a first predetermined higher energy state, respective ones of said atoms losing energy so as to achieve a predetermined ground energy state, whereby laser action having an intensity corresponding to the cube of said pumping energy is achieved by cooperative energy unconversion induced by interactions between ions in said laser crystal.

2. The arrangement of claim 1 wherein the extent to which said laser crystal is doped with trivalent erbium is on the order of 5%.

3. The arrangement of claim 1 wherein the energy produced by said two atoms returning to said predetermined ground energy state is applied to elevate a third atom to a second predetermined higher energy state which is higher than said first predetermined higher energy state.

4. The arrangement of claim 1 wherein said atoms within said laser crystal are erbium ions.

5. The arrangement of claim 1 wherein said laser crystal is configured to have first and second ends, said first end having a convex surface configuration, and said second end having a plane surface configuration.

6. The arrangement of claim 5 wherein said convex surface configuration of said first end of said laser crystal has a convex radius of curvature of approximately 2.5 centimeters.

7. The arrangement of claim 6 wherein said first and second ends are each provided with a respective one of first and second coatings applied thereto, said coatings each having a respective predetermined reflectivity.

8. The arrangement of claim 7 wherein said first coating has a reflectivity characteristic which varies with wavelength, said first coating having a reflectivity of approximately 0.25% at a wavelength of approximately 0.855 microns.

9. The arrangement of claim 7 wherein said second coating has a reflectivity of approximately 98% at a wavelength of 2.8 microns, and further operates as an output coupler.

10. The arrangement of claim 1 wherein there is further provided cooling means for reducing a temperature of said laser crystal to approximately 77° K.

11. The arrangement of claim 1 wherein said laser crystal is formed of $CsCdBr_3$ which is isomorphic with $CsNiCl_3$.

12. A method of creating continuous-wave laser emission, the method comprising the steps of:

providing a multiple quantum level environment for atoms wherein said atoms can achieve selectably higher and lower quantum levels than their initial excited state;

cooling said multiple quantum level environment;

controlling emission of an output light to a wavelength of approximately 0.855 microns;

providing a pumping source for generating a pumping energy; and directing said pumping energy toward said multiple quantum level environment so as to cause respective ones of said atoms within said multiple quantum level environment to gain energy and assume a respectively higher energy state than said initial excited state and respective others of said atoms to lose energy and assume a lower energy state than said initial excited state, whereby the continuous-wave laser action is achieved by cooperative energy upconversion induced by atom-atom interactions.

13. The method of claim 12 wherein said step of providing a multiple quantum level environment comprises the further step of doping said multiple quantum level environment with a dopant which is characterized by containing multivalent rare earth ions.

14. The method of claim 13 wherein said dopant is erbium.

15. The method of claim 13 wherein said multiple quantum level environment is formed of calcium fluoride.

16. The method of claim 13 wherein said multiple quantum level environment is formed of $CsCdBr_3$ which is isomorphic with $CsNiCl_3$.

17. The method of claim 13 wherein said dopant is a rare earth ion.

18. The method of claim 13 wherein said dopant is a transition metal ion.

19. A method of creating continuous-wave laser emission having a predetermined wavelength characteristic, the method comprising the steps of:

providing a multiple quantum level environment for atoms associated with a multivalent dopant, the multiple quantum level environment being characterized by having at least three energy levels wherein said atoms can achieve selectably higher and lower quantum levels than their initial excited states;

providing a pumping source for generating a pumping energy having a wavelength characteristic which is longer than that of the laser emission; and directing said pumping energy toward said multiple quantum level environment so as to cause respective ones of said atoms within said multiple quantum level environment to gain energy and assume a respectively higher energy state, at two of said atoms losing energy and assume a lower energy state, whereby the continuous-wave laser action is achieved by cooperative energy unconversion induced by triple atom interactions.

20. The method of claim 19 wherein the respectively higher energy state is at least two quantum levels above the initial excited state, and the laser action has a wavelength characteristic responsive to one of said energy levels.

* * * * *